C. F. CLARK & A. DE COSTE.
APPARATUS FOR MAKING PUTTEES.
APPLICATION FILED OCT. 16, 1915.
1,189,345.
Patented July 4, 1916.
3 SHEETS—SHEET 3.
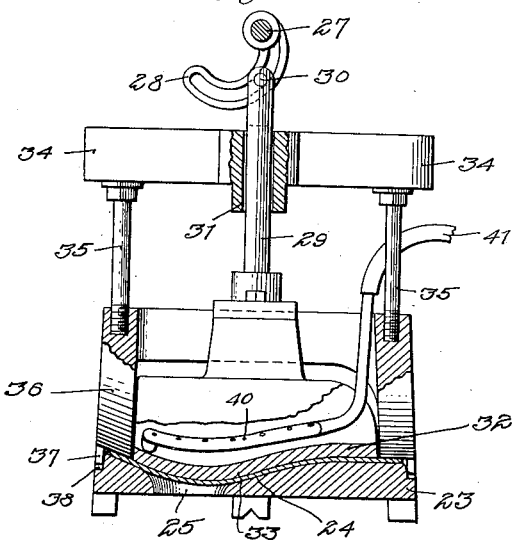
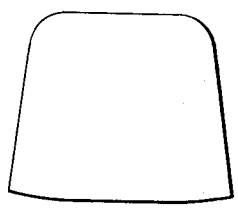
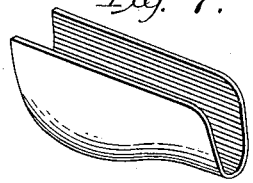
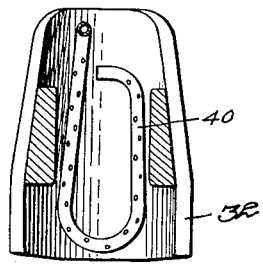
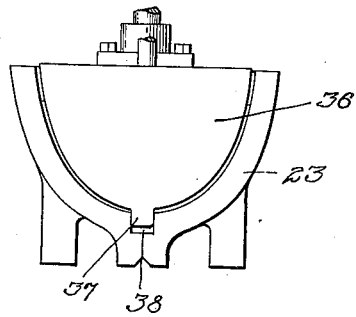
Inventors
Charles F. Clark
Albert De Coste
By Brown, Hanson & Roettcher
Attys

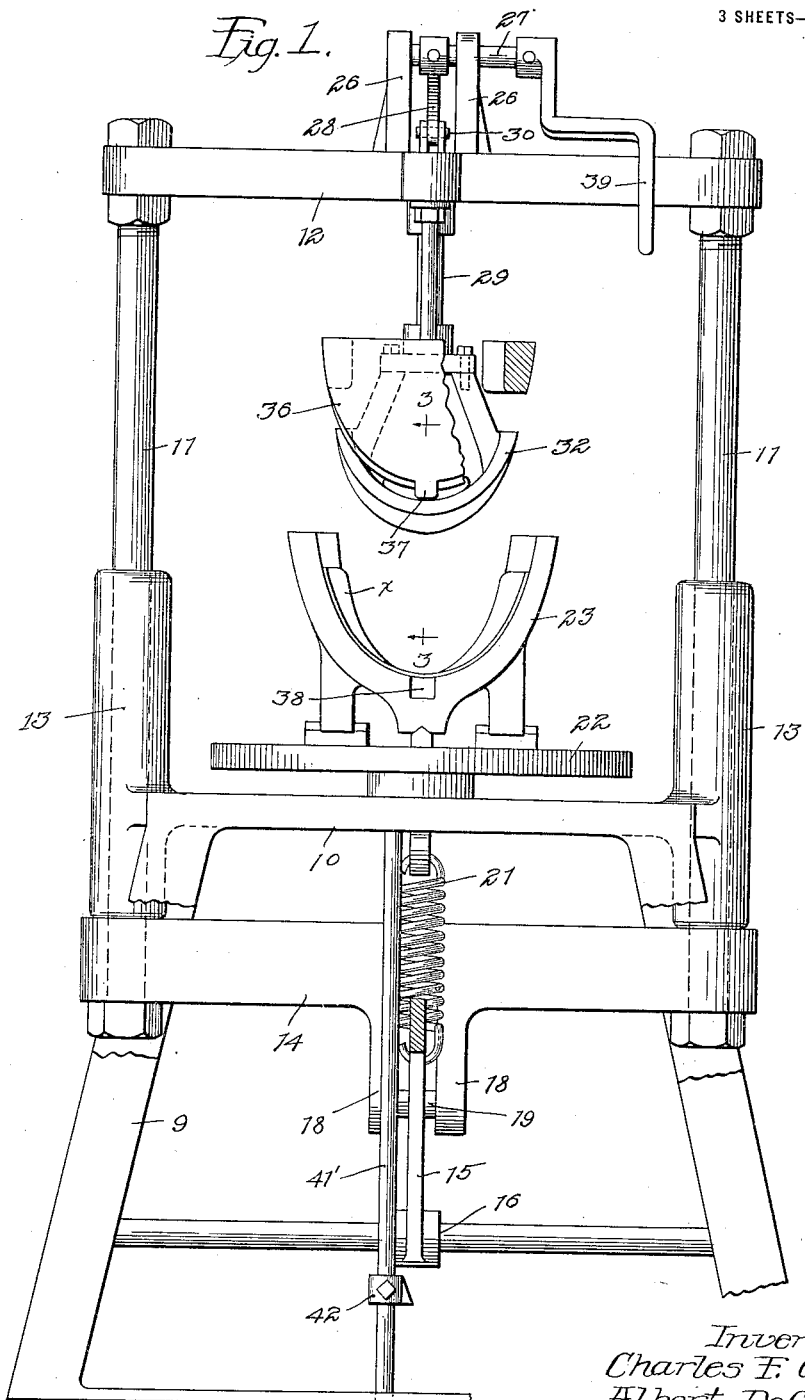

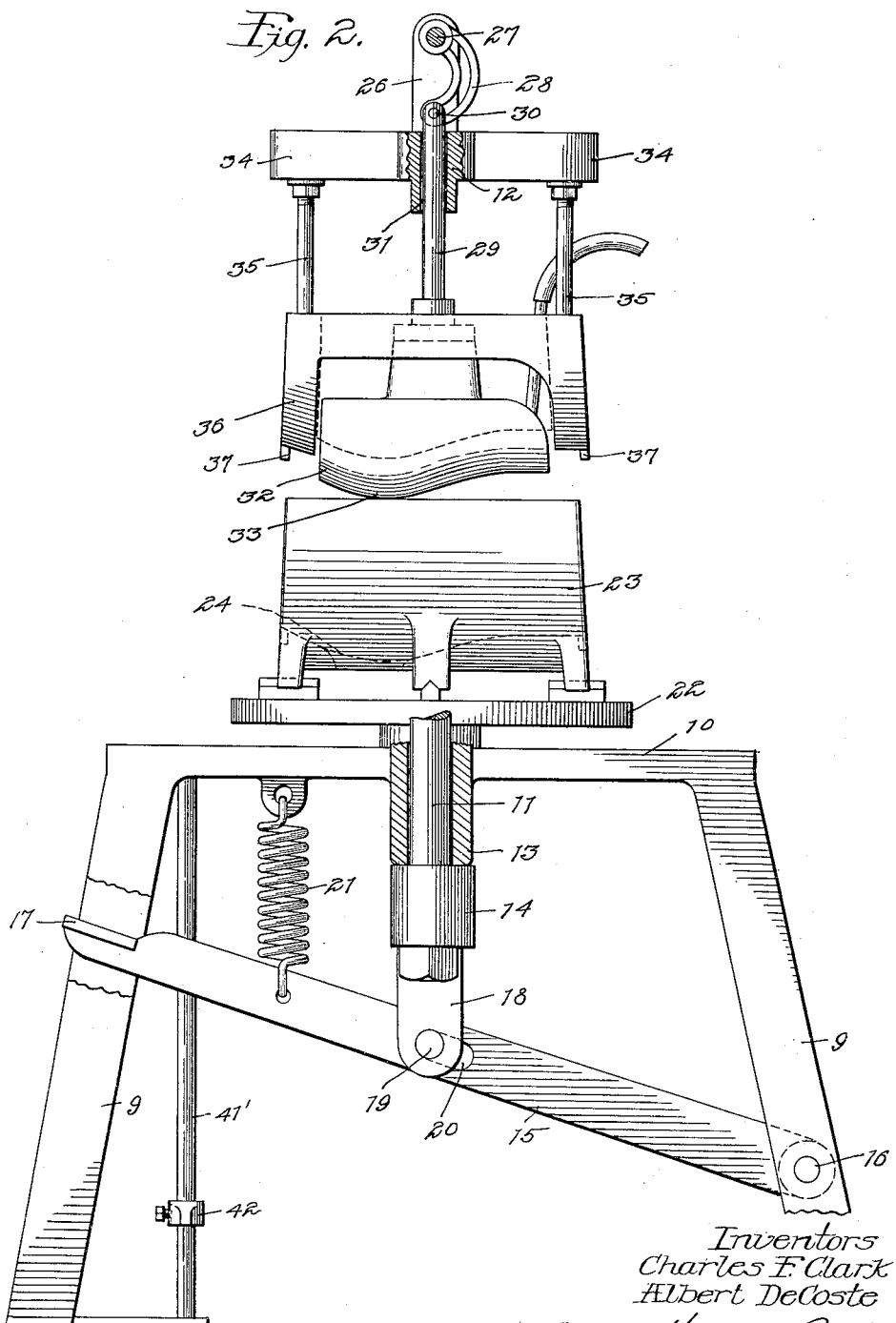

UNITED STATES PATENT OFFICE.

CHARLES F. CLARK AND ALBERT DE COSTE, OF CHICAGO, ILLINOIS, ASSIGNORS TO CHARLES F. CLARK, OF CHICAGO, ILLINOIS.

APPARATUS FOR MAKING PUTTEES.

1,189,345. Specification of Letters Patent. Patented July 4, 1916.

Application filed October 16, 1915. Serial No. 56,211.

*To all whom it may concern:*

Be it known that we, CHARLES F. CLARK and ALBERT DE COSTE, citizens of the United States, residing at Chicago, in the county of Cook and State of Illinois, have invented a certain new and useful Improvement in Apparatus for Making Puttees, of which the following is a full, clear, concise, and exact description, reference being had to the accompanying drawings, forming a part of this specification.

Our invention relates to apparatus for manufacturing puttees, or leggings, or similar articles, out of leather or similar material.

The processes and apparatuses of the prior art are crude, cumbersome and inefficient, and it is the object of our invention to improve and simplify this manufacture and to provide means for enlarging the production without the employment of additional labor.

It is now the practice to fashion a piece of leather in cylindrical form, sewing the adjacent edges together, and then force forming blocks into the cylinder thus formed in order to give the puttee or legging the proper formation, these forming blocks being inserted while the leather is wet and the leather article being then allowed to dry thereon. After that, the cylinder is cut open and the finishing of the article proceeds.

It is the purpose of our invention to eliminate unnecessary steps and to do by machinery that which heretofore has been done by hand.

We shall describe our invention as concerned with the manufacture of puttees and the machine which we have illustrated in the accompanying drawings is a machine specially constructed for that purpose.

In these drawings—Figure 1 is a front elevational view of the machine of our invention, parts being broken away to illustrate the construction, as will be described; Fig. 2 is a side elevational view of the machine; Fig. 3 is a sectional view of the die construction employed, being taken approximately on the line 3, 3, of Fig. 1 and looking in the direction indicated by the arrows; Fig. 4 is a fragmentary plan view of a portion of the die; Fig. 5 is an elevational view of the dies in a position different from that of Fig. 1; Fig. 6 illustrates the blank employed for the manufacture of a puttee; Fig. 7 illustrates the result of a certain step in the process, which will be described, and Fig. 8 illustrates the result of another step in the process.

Referring first to Figs. 1 and 2 it will be seen that the machine comprises a general frame-work 9 which provides a table 10, uprights 11, 11, and an overhead cross-beam 12, the uprights 11, 11, being mounted for vertical reciprocation in the tubular standards 13, 13 and being joined together below these standards by means of the lower cross-bar 14. Thus, the rectangular frame-work comprising the parts 11, 12 and 14 reciprocate relative to the table 10.

A foot lever 15 is pivoted to the main frame-work 9 at 16 and is provided at its free forward end with a foot-piece 17 whereby the operator may depress it. The foot lever 15 extends between the downwardly extending lugs 18, 18, on the lower cross-bar 14 and a pin 19 carried by the lugs extends through a slot 20 in the foot lever. A coiled spring 21 is connected between the table 10 and the foot lever 15 and normally holds the foot lever in its upper position. It will be clear that when the coiled spring 21 holds the foot lever in its upright position, it also maintains the rectangular frame, which has been described, in its upright position, and when the foot lever is depressed against the tension of the spring 21 the rectangular frame will be brought down for a purpose which will be described presently.

Upon the table 10 a sub-table 22 is provided, and upon this sub-table the lower dished die 23 is correctly and accurately mounted. This dished die 23, as illustrated in Fig. 3, is provided with the auxiliary depression 24 and the opening 25, for a purpose which will be described.

Centrally located upon the upper cross-bar 12 are a pair of supports 26, 26, in which a shaft 27 is mounted. Secured to this shaft 27 is a slotted cam arm 28 from which a rod 29 hangs by means of a pin 30, the rod 29 passing freely through an opening 31 in the cross-bar 12. Upon the lower end of the rod 29 the inner male die 32 is mounted, this die having its die surface formed to correspond with the inner part of the dished female die 23, a part 33 of the male die 32 corresponding with the part 24 of the female die 23.

The cross-bar 12 has extending therefrom at right angles thereto the arms 34, 34, from each of which a rod 35 extends downwardly. Secured to the lower ends of the rods 35, 35, is the outer male die 36 which surrounds the inner male die 32 and which is arranged to form a continuation thereof, the inner die fitting snugly within the outer die. The die face of the outer male die 36 corresponds with the corresponding face of the female dished die 23. The male die 36 is provided with the downwardly extending matching lugs 37, 37, which coöperate with the matching notches 38, 38 on the female die so as to insure proper registry of the parts when the dies come together.

An operating handle 39 is secured upon the shaft 27 so that the shaft 27 may be turned to operate the cam arm 28 whereby relative movement between the two male dies may be secured, as will be described.

A gas burner 40 is disposed within the inner male die 32, so that the die may be heated, this burner being fed by means of a gas hose 41 leading from a suitable source.

At the front of the machine below the table 10 a vertical rod 41' is provided, this rod carrying a stop 42 under which the foot lever 15 may be caught when it is desired to hold the movable frame in its lower position.

Our process and the operation of our apparatus will now be described.

A blank of leather, or similar material, as illustrated in Fig. 6, is first dampened thoroughly, nearly to the extent of soaking it, and is placed in the female die 23 in the manner illustrated at x in Fig. 1, with its larger end over the depression 24. It is assumed now that the male die 32 is properly heated by means of the burner 40 with the operating lever 39 thrown into its extreme upward position (that shown in Fig. 1 being the lower position). The foot lever 15 is then depressed to bring the male dies down within the female die and to clamp the piece of leather x firmly between the female die and the outer male die 36, it being apparent that when the foot lever is depressed the outer male die will be brought firmly down upon the piece of leather and will firmly clamp the entire periphery of the piece of leather against the female die. After this operation the arm or lever 39 is brought down by swinging down the arm or lever 39, thus punching down the central part of the piece of leather into the depression 24, this movement of the inner male die being independent of the outer male die and taking place while the outer male die is firmly holding the periphery of the leather blank against the female die. The firm clamping of the periphery of the piece of leather during the punching action in the middle of the piece of leather secures the proper stretching to give the desired shape to the puttee. When the inner male die 32 has been brought down to the point of being flush with the outer male die 26 it will, with the outer male die, form a complete complement to the female die with the central portion of the piece of leather stretched into the desired shape without allowing the periphery of the blank to lend itself to the action. The opening 25 permits of the exit of accumulated water which might stain the leather. The dies are properly matched together by means of the lugs 37 and notches 38 and are held in position closed together until the piece of leather is dried out to the extent of retaining its shape. The piece of leather is then taken from the machine in the form illustrated in Fig. 7. It is then rolled up, as indicated in Fig. 8, and a band y is disposed around the article thus rolled in order to maintain it in a form smaller than its ultimate form. As thus rolled, the article is allowed to dry completely when it is ready for any suitable finishing.

We claim as new and desire to secure by Letters Patent:

1. In combination, a female die having a cavity of the shape of the finished article to be produced, a male die having the shape of the margin of said cavity, and another male die within said first-named male die having the shape of the portion of said cavity within said margin, said male dies having movement independently of each other.

2. In combination, a female die having a concave form with an additional depression therein, a male die having the shape of the margin of the concavity in said female die, and another male die within said first-named male die, said male dies having movement independently of each other.

3. In combination, a female die having a concave form with an additional depression therein, a male die having the shape of the margin of the concavity in said female die, and another male die within said first-named male die and formed to correspond to said additional depression, said male dies having movement independently of each other.

4. In combination, a female die having a cavity of the shape of the finished article to be produced, a male die having the shape of the margin of said cavity, and another male die within said first-named male die having the shape of the portion of said cavity within said margin, said male dies having movement independently of each other so that a piece of material may first be clamped between said first-named male die and said female die and then stretched by the depression of said second-named male die.

5. In combination, a female die having a cavity of the shape of the finished article to be produced, a male die having the shape of the margin of said cavity, and another male die within said first-named male die having the shape of the portion of said cavity within said margin, said male dies having movement independently of each other, said last named male die being loosely mounted.

6. In combination, a female die having a cavity of the shape of the finished article to be produced, a male die having the shape of the margin of said cavity, another male die within said first-named male die having the shape of the portion of said cavity within said margin, said male dies having movement independently of each other, and means for moving each of said male dies.

7. In combination, a female die having a cavity of the shape of the finished article to be produced, a male die having the shape of the margin of said cavity, another male die within said first-named male die having the shape of the portion of said cavity within said margin, said male dies having movement independently of each other, and means for heating said inner male die.

8. In combination, a female die having a cavity of the shape of the finished article to be produced, a male die having the shape of the margin of said cavity, another male die within said first-named male die having the shape of the portion of said cavity within said margin, said male dies having movement independently of each other, means for moving each of said male dies, and means for normally maintaining said male and female dies separated.

9. In combination, a female die having a cavity of the shape of the finished article to be produced, a male die having the shape of the margin of said cavity, another male die within said first-named male die having the shape of the portion of said cavity within said margin, said male dies having movement independently of each other, means for moving said male dies together, and means for giving a further independent movement to the inner male die.

10. In combination, a female die having a cavity of the shape of the finished article to be produced, a male die having the shape of the margin of said cavity, another male die within said first-named male die having the shape of the portion of said cavity within said margin, said male dies having movement independently of each other, and means for registering said dies.

In witness whereof, we hereunto subscribe our names this 12th day of October A. D. 1915.

CHARLES F. CLARK.
ALBERT DE COSTE.

Copies of this patent may be obtained for five cents each, by addressing the "Commissioner of Patents, Washington, D. C."